C. T. COLE.
TESTING APPARATUS FOR SPARK COILS, PLUGS, &c.
APPLICATION FILED FEB. 24, 1917.
1,282,760.
Patented Oct. 29, 1918.
2 SHEETS—SHEET 1.
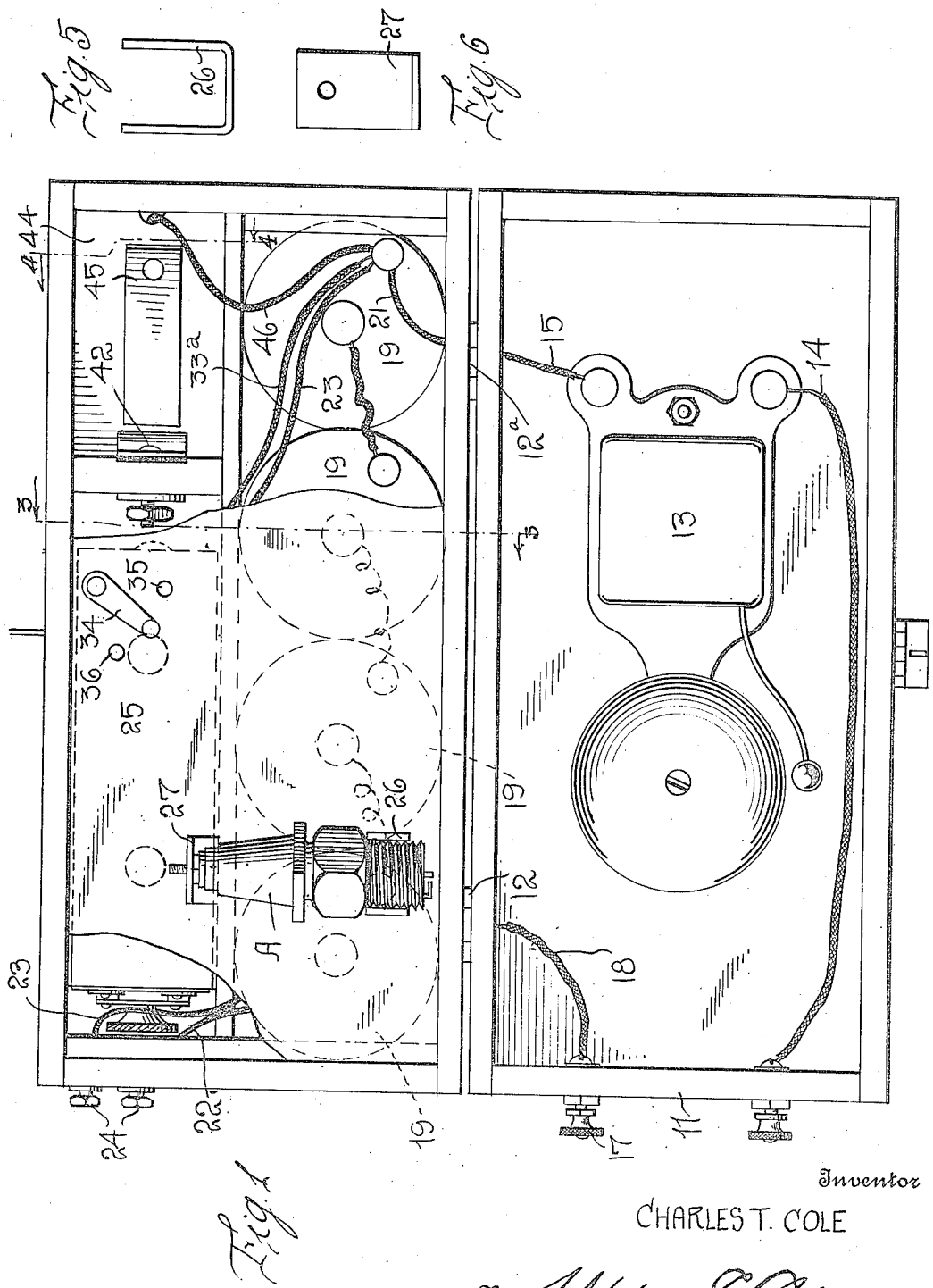
Inventor
CHARLES T. COLE
By Watson E. Coleman
Attorney

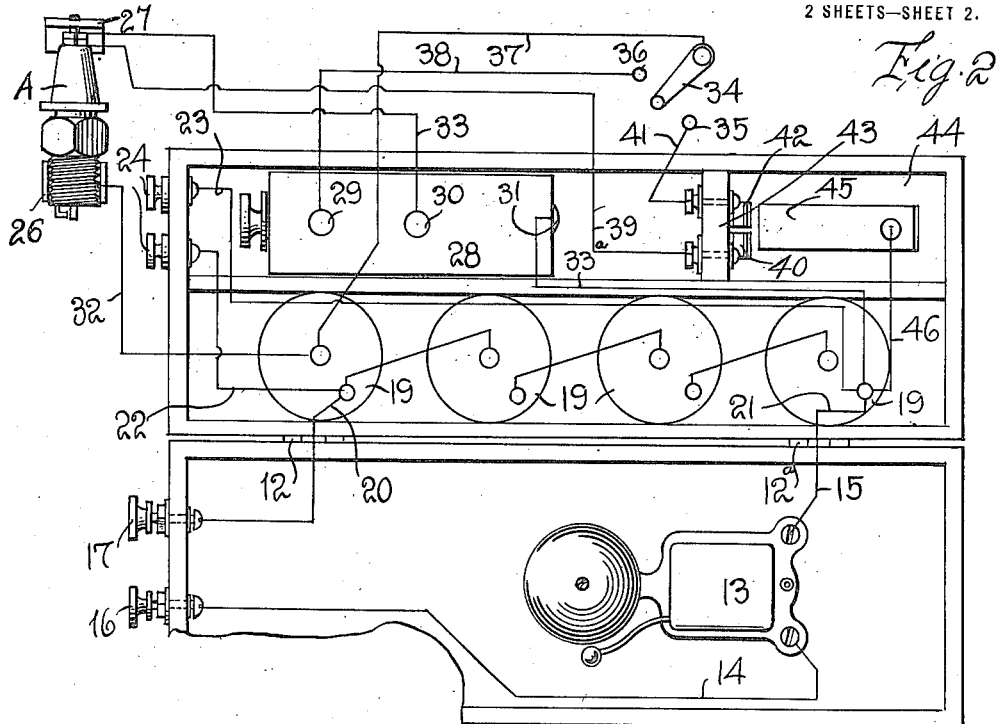
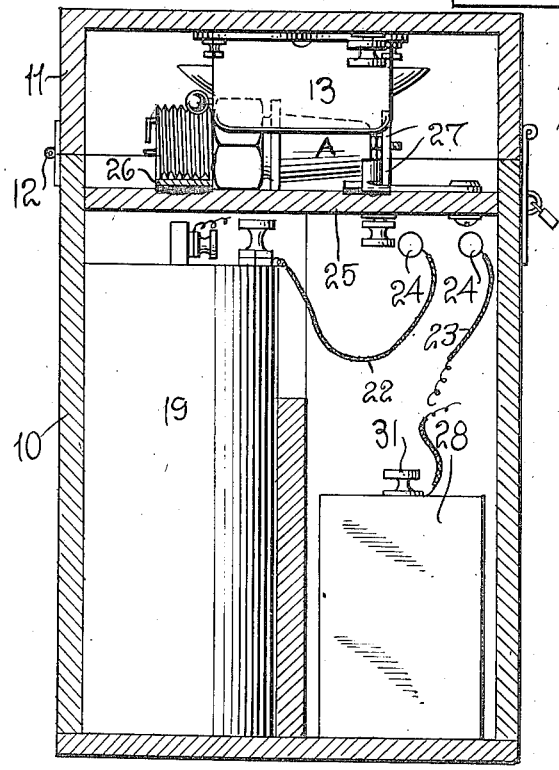
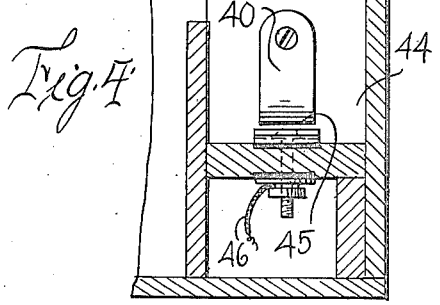

UNITED STATES PATENT OFFICE.

CHARLES T. COLE, OF ROUNDUP, MONTANA.

TESTING APPARATUS FOR SPARK COILS, PLUGS, &c.

1,282,760.

Specification of Letters Patent.

Patented Oct. 29, 1918.

Application filed February 24, 1917. Serial No. 150,770.

*To all whom it may concern:*

Be it known that I, CHARLES T. COLE, a citizen of the United States, residing at Roundup, in the county of Musselshell and State of Montana, have invented certain new and useful Improvements in Testing Apparatus for Spark Coils, Plugs, &c., of which the following is a specification, reference being had to the accompanying drawings.

This invention relates to electrical mechanisms and particularly to testing apparatus.

The general object of this invention is to provide means for testing the condition of spark plugs or spark coils and particularly provide improved means to these ends having few parts and simple connections, the apparatus being contained within a carrying case whereby it may be easily transported from place to place.

A further object of the invention is to provide a construction of this character in which the testing apparatus may be disposed in the ignition circuit and ordinarily used in the same manner as the ordinary batteries, the carrying case to this end being provided with certain connections whereby the batteries may be normally disposed in the ignition circuit, provision being made, however, whereby the batteries may be used for testing as above stated.

A further object of the invention is to provide a testing mechanism of the character described including a holder for spark coil boxes having contacts so arranged as to engage with the contacts of an ordinary spark coil box when the latter is placed in the holder to thereby do away with the necessity of holding the coil box in the hand while it is being tested and its vibrator adjusted.

Still another object is to produce in connection with the coil and plug testing devices means for detecting short circuits in wirings and magnetos.

Other objects will appear in the course of the following description.

My invention is illustrated in the accompanying drawings, wherein—

Figure 1 is a top plan view of a testing box constructed in accordance with my invention, the plate 25 being broken away;

Fig. 2 is a diagrammatic view of the construction shown in Fig. 1 and illustrating the wiring of the apparatus;

Fig. 3 is a vertical section on the line 3—3 of Fig. 1 but showing the cover of the box closed;

Fig. 4 is a fragmentary section on the line 4—4 of Fig. 1;

Fig. 5 is an elevation of one of the plug supporting clips; and

Fig. 6 is an elevation of the other clip.

Referring to these drawings, 10 designates a box or carrying case having a cover 11 which is hinged to the body of the box by metallic hinges 12 and $12^a$. Disposed upon the inner face of the cover is an electric bell 13, the wires 14 and 15 of which extend, one to one of the hinges 12 and the other to a binding screw 16. Leading from a binding screw 17 is a wire 18 which extends to the other hinge 12. Disposed within the box 10 are a plurality of dry cells 19 and the hinge 12 is connected by a wire 20 to one of the dry cells at one end of the body and the last cell of the series is connected by a wire 21 to the other hinge $12^a$. It will thus be seen that if the binding screws 16 and 17 are electrically connected, a circuit will be completed through the battery and through the bell 13 and the bell will sound. The mechanism just referred to is designed to be used for detecting short circuits in magnetos, ignition circuits, and in other like circumstances.

From the first and last cells of the battery extend the wires 22 and 23 leading to binding screws 24 whereby connection may be made to the ignition system of the gas engine so that the ignition system may be run upon the battery as for instance in starting it.

For the purpose of testing spark plugs and also spark coils, I dispose in the top of the box a plate 25 having thereon a U-shaped clip 26 of metal, which clip is insulated from the member 25. Coacting with the U-shaped clip 26, which by the way forms a contact, is a metallic supporting member 27 of metal insulated from the member 25 and formed with a perforation for the metallic stem or electrode of a spark plug, the U-shaped clip being adapted to embrace the metallic bushing of the spark plug. Disposed within the box or case 10 is a spark coil box 28 of any usual or suitable construction and having the usual three contacts 29, 30, and 31, the contact 31 being in the bottom of the box. The clip 26 is connected by means of the wire 32 to the positive pole of the first cell of the battery, while the clip member 27 is connected by the wire 33 with the contact 30 of the coil box 28. From the contact 31 of this box a wire 33ᵃ connects to the last cell of the battery. Mounted upon the plate 25 is a switch comprising a switch arm 34 and the contact studs 35 and 36. The arm 34 is electrically connected by means of the wire 37 with the positive pole of the first cell of the battery and the contact 36 is connected by means of a wire 38 to the contact 29 of the coil box 28. It will, therefore, be seen that when the switch arm 34 is turned so as to engage with the contact stud 36 a circuit will be completed through the primary coil of the coil box and that a circuit will also be completed through the secondary coil and the spark plug A mounted in the clips 26 and 27, and that thus a spark will be caused to jump between the electrodes of the spark plug.

The clip member 27 is connected by means of a wire 39 to a contact 40 while the contact stud 35 is connected by means of a wire 41 to a contact 42. These contacts are mounted upon a vertically disposed wall 43, the contact 42 being the uppermost contact and the contact 40 the lowermost contact. The wall 43 defines one side of a pocket designated generally 44, which pocket is adapted to contain the coil box of the coil to be tested. As before explained, all coil boxes today have two contacts on the side and one contact on the bottom. The contacts 40 and 42 are adapted to engage with the contacts on the side of the box and in the bottom of the pocket is a contact 45 which is electrically connected by the wire 46 to one pole of the last cell of the battery. The contacts 40 and 42 are in the form of resilient metallic strips outwardly bowed from the wall 43 so as to resiliently engage the coil box, hold it firmly in place within the pocket 44, and make a good contact with the contacts of the coil box, and the contact 50 is also in the form of a resilient metallic strip insulated from the bottom of the pocket 44 and having one end attached to the bottom of the pocket while the other end extends slightly upward so that when the box is put in the pocket, the contact 45 will be forced against the bottom contact of the coil box and have good electrical engagement therewith.

Now if it be desired to test a coil, the coil box to be tested is placed within the pocket 44, as before described, and the switch arm 34 is shifted into engagement with the contact 35. Thus the circuit is completed through the primary coil of the coil box to be tested and through the secondary coil of the coil box to be tested. The plug A is supported upon the clips 26 and 27. Therefore, if the coil box be in good condition and the vibrator of the coil box be properly adjusted, a shower of sparks will be emitted between the electrodes of the spark plug. It will be obvious of course that in testing the spark coil, a perfectly good spark plug should be used.

It will be seen that with the mechanism as above described, a short circuit may be tested by connecting the terminals or binding screws 16 and 17 in the circuit to be tested and then, if there is a short circuit, the bell 13 will be actuated. Normally of course the ignition circuit may be connected up through the binding screws 24 with the batteries so that a battery ignition may be secured. At the same time the spark plugs and coils may be tested as before described without the necessity of disconnecting the connections from the battery to the ignition system.

It will be noted that when the lid is closed on the box that connections may be still readily made through the binding posts 24, through the ignition system of the engine, and that connections may be readily made through the binding posts 16 and 17 to discover if there is a short circuit and that the only time when it is necesary to open the case is when it is desired to test spark plugs or test a coil.

Having described my invention, what I claim is:

1. A testing apparatus including a case, a battery in the case, an electrically actuated short circuit indicating signal mounted on the case, a pair of binding posts, the signal being electrically connected in a normally open circuit with the battery and the binding posts, a pair of spark plug supporting clips mounted on the case and insulated from each other, a spark coil permanently mounted in the case, electrical connections whereby the spark coil is electrically connected to the battery and to said clips, a spark coil compartment formed in the case and having four walls, electrical contacts mounted on said walls and adapted to electrically engage with contacts on a spark coil box inserted in said compartment, electrical connections from the contacts in the spark coil compartment to the battery and to one of said spark plug clips, and a switch, whereby a circuit may be completed, including the spark plug clips, the battery and the coil box, and whereby a circuit may be completed through the contacts of the spark coil compartment, said battery and the spark plug clips.

2. In a testing apparatus, a case having a cover hinged thereto, said case having a partition defining one side of a battery compartment, a battery disposed within said compartment, an electrically actuated short circuit signal mounted on the cover, a pair of binding posts on the cover, the signal being electrically connected in a normally open circuit with the battery and the binding posts, a removable support disposed within the case and resting upon said partition and covering the battery compartment, a pair of metallic spark plug supporting clips mounted on said member, a spark coil permanently disposed within the case on the other side of said partition and beneath said supporting member, electrical connections whereby the spark coil is electrically connected to the battery and to said clips, a vertical partition which, with the first partition, forms a spark coil compartment, the walls of said spark coil compartment having electrical contacts adapted to electrically engage with contacts on the spark plug box, electrical connections from the contacts to the battery and to one of said spark plug clips, and a switch mounted upon said supporting member and operatively connected to the electrical connections whereby a circuit may be completed including the spark plug clips, the battery and the coil box and whereby a circuit may be completed through the contacts of the spark coil compartment, said battery and the spark plug clips.

In testimony whereof I hereunto affix my signature in the presence of two witnesses.

CHARLES T. COLE.

Witnesses:
   IVAN F. ENGLE,
   CHARLES R. BRAITHWAITE.